Figure 1:
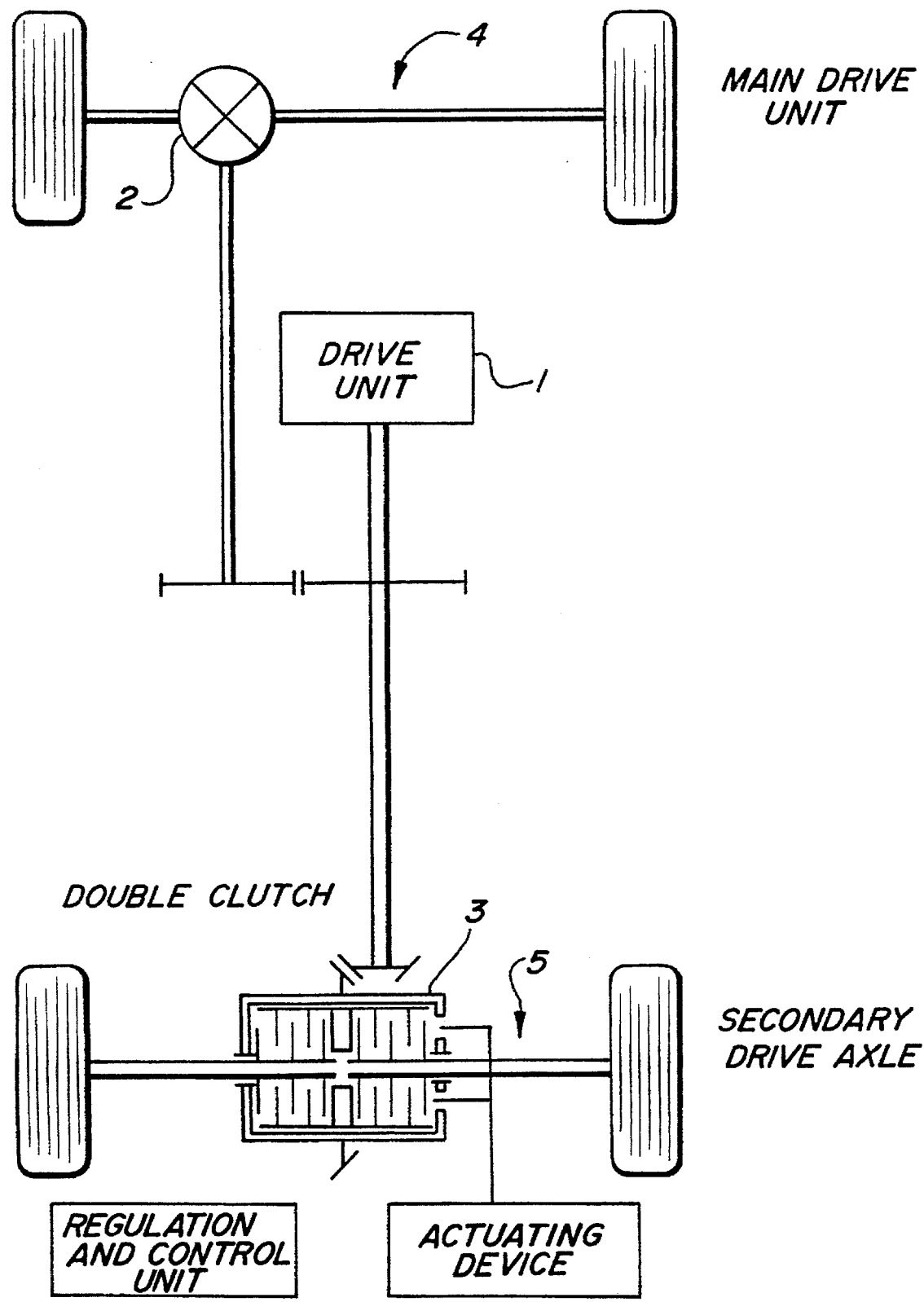

United States Patent [19]

Frank et al.

[11] Patent Number: 5,484,033
[45] Date of Patent: Jan. 16, 1996

[54] DRIVE ASSEMBLY

[75] Inventors: Michael Frank, Köln; Eugen Stall, Neunkirchen-Seelschied; Robert Rickell, Siegburg, all of Germany

[73] Assignee: GKN Automotive AG, Siegburg, Germany

[21] Appl. No.: 161,981

[22] Filed: Dec. 2, 1993

Related U.S. Application Data

[63] Continuation of Ser. No. 717,634, Jun. 19, 1991, abandoned.

[30] Foreign Application Priority Data

Jul. 7, 1990 [DE] Germany .................. 40 21 747.7

[51] Int. Cl.⁶ .................................................. B60K 17/35
[52] U.S. Cl. .................. 180/245; 74/650; 10/249; 192/58.4
[58] Field of Search .................. 180/248, 249, 180/250, 247, 245, 76; 192/58 C, 48.8; 74/650; 475/900, 231

[56] References Cited

U.S. PATENT DOCUMENTS

| | | | |
|---|---|---|---|
| 4,644,823 | 2/1987 | Mueller | 180/248 |
| 4,679,463 | 7/1987 | Ozaki et al. | 74/711 |
| 4,934,213 | 6/1990 | Niizawa | 475/86 |
| 4,949,594 | 8/1990 | Galhotra | 180/248 |
| 4,950,214 | 8/1990 | Bottrill | 475/231 |
| 4,981,192 | 1/1991 | Kurihara et al. | 74/650 |
| 5,000,522 | 3/1991 | Matsuda et al. | 180/248 |
| 5,004,085 | 4/1991 | Taureg | 180/248 |
| 5,007,886 | 4/1991 | Holmquist et al. | 475/231 |
| 5,041,065 | 8/1991 | Kwoka | 180/248 |
| 5,065,836 | 11/1991 | Hamad et al. | 180/245 |
| 5,119,900 | 6/1992 | Watanabe | 180/249 |

FOREIGN PATENT DOCUMENTS

| | | | |
|---|---|---|---|
| 0189556 | 6/1986 | European Pat. Off. | |
| 0239763 | 10/1987 | European Pat. Off. | |
| 0311139 | 4/1989 | European Pat. Off. | 180/248 |
| 0635368 | 8/1936 | Germany . | |
| 8807664 | 9/1988 | Germany . | |
| 3813305 | 11/1988 | Germany . | |
| 47-10658 | 4/1972 | Japan . | |
| 54-44064 | 12/1979 | Japan . | |
| 59-68846 | 5/1984 | Japan . | |
| 1261554 | 10/1989 | Japan . | |
| 2146357 | 6/1990 | Japan . | |
| 0241837 | 9/1990 | Japan | 180/248 |
| 0503661 | 4/1939 | United Kingdom . | |
| 0985090 | 3/1965 | United Kingdom . | |
| 3403883 | 9/1985 | United Kingdom . | |

Primary Examiner—Margaret A. Focarino
Assistant Examiner—Anne Marie Boehler
Attorney, Agent, or Firm—Harness, Dickey & Pierce

[57] ABSTRACT

A drive assembly for a motor vehicle, having two drivable axles, a first axle being driven permanently by a drive unit and at least a second axle being connectable via a double coupling assembly so as to be externally controllable. The double coupling assembly comprises a common drivable coupling carrier with outer plates and individual sets of inner plates each connected to the axles of the second driving axle. The double coupling is actuated by a common actuating device, thereby permitting both sets of plates of the double coupling to be loaded by the same amount of actuation forces.

2 Claims, 2 Drawing Sheets

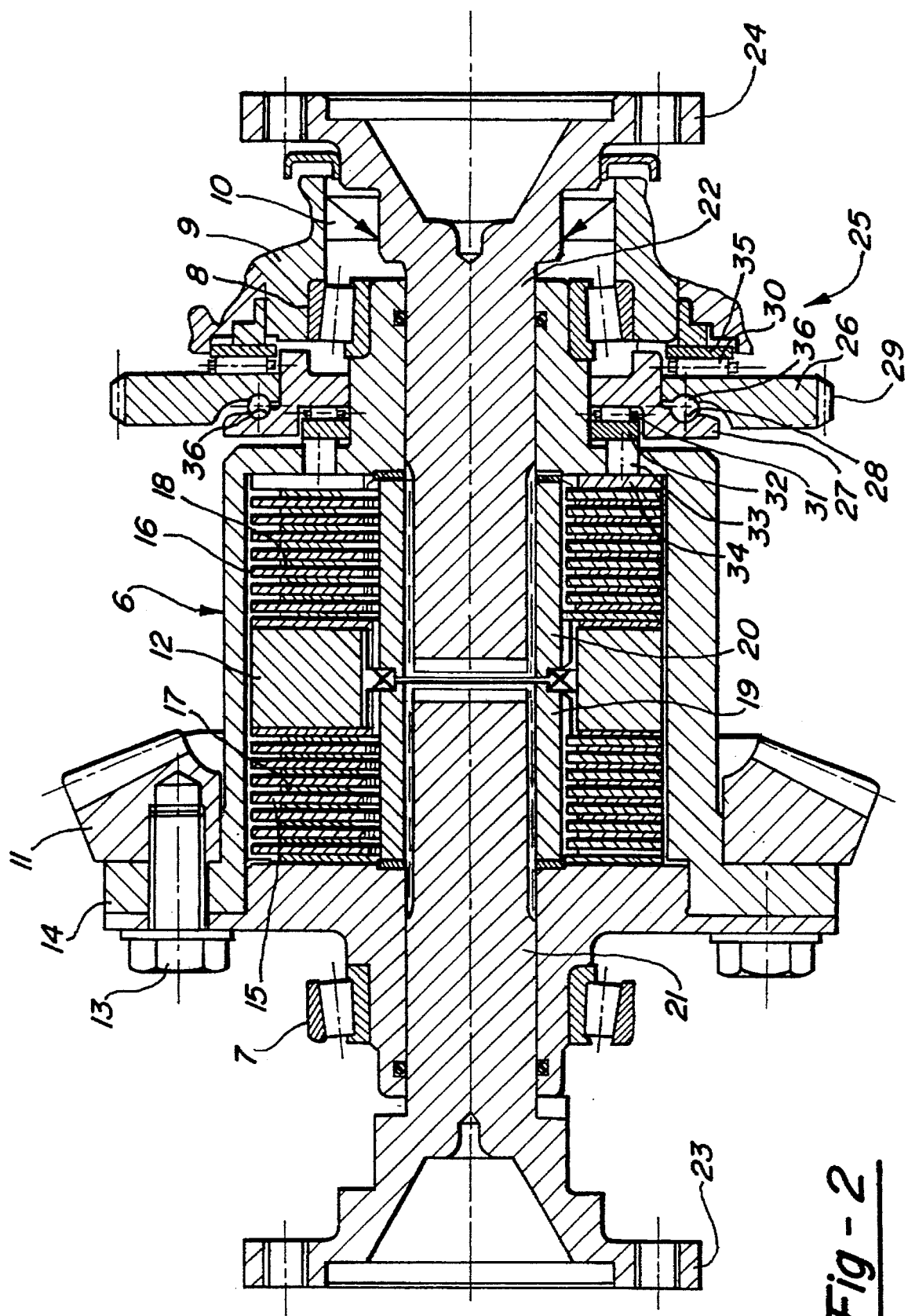

DRIVE ASSEMBLY

This is a continuation of U.S. patent application Ser. No. 717,634, filed Jun. 19, 1991, now abandoned

DESCRIPTION

The invention relates to a drive assembly for a motor vehicle, having two drivable axles, a first axle being driven permanently by a drive unit and at least a second axle being connectable via a double coupling assembly so as to be externally controllable, with the double coupling assembly comprising a common drivable coupling carrier with outer plates and individual sets of inner plates each connected to the axles of the second driving axle.

DE 88 07 664.4 U 1 proposes a drive assembly in the case of which both driving axles comprise a double coupling assembly and which, in consequence, permits torque distribution between the axles without having a differential. The double coupling assemblies of the axles are provided with an independent actuating assembly for each set of plates, so that even between the axles it is possible to control the distribution of torque as a function of the parameters of the vehicle condition. In particular, the intention is to take the steering angle into account. From DE 38 13 305 A 1 there is known a double coupling assembly for a vehicle drive assembly in the case of which the two sets of plates are controlled by a common actuating assembly.

With a view to the initially mentioned drive assembly involving complicated control mechanisms, it is the object of the present invention to provide a drive assembly of that type which features a much simpler design and permits simple control mechanisms, with a special characteristic being that the second axle is connected only temporarily and when required. The components used are to be designed particularly simply. The objective is achieved in that the double coupling is actuated by a common actuating device, thereby permitting both sets of plates of the double coupling to be loaded by the same amount of actuation forces. In this way it is possible to eliminate the central differential and provide a second connectable axle which is of the simplest possible design but which nevertheless prevents any torsion in the driveline when negotiating curves and thus also the disadvantageous switching pressure when releasing the second axle, for instance when introducing the braking process. The permanently driven main driving axle may be provided with a prior art mechanical differential, especially with a self-locking effect. The coupling housing of the second driving axle is permanently driven by the drive unit.

The common actuating assembly for the two sets of plates of the double coupling in the second driving axle may operate on the hydraulic, pneumatic, electric or electromagnetic principle.

An actuating assembly for the double coupling, which is particularly advantageous, features a simple design and is easy to control. It comprises a mechanical expanding mechanism which, in turn, comprises two expanding discs which are rotatable relative to each other and which are provided with rolling members which run in rolling member guiding tracks rising in opposite directions and which, upon rotation of one of the expanding discs, cause an axial forward movement of the expanding disc acting on the sets of plates. Actuating assemblies of this type have already been described in connection with differential locks. The characteristic curve may feature a non-linear, especially degressive adjustment of the coupling plates as a function of the angle of rotation determined by the setting member.

The drive assembly as a whole and a preferred embodiment of the double coupling used are illustrated in the drawings where FIG. 1 shows the operating principle of the drive assembly. FIG. 2 shows a longitudinal section through a preferred double coupling assembly.

The diagram with glossary as illustrated in FIG. 1 is essentially self-explanatory. It shows a main driving axle and a connectable second driving axle which are both drivable by a drive unit via controllably connected drivelines. The main driving axle symbolically shows a differential 2 and the second driving axle a double coupling unit 3. The latter comprises an actuating device which is intended for both sets of plates connected to the driving wheels and which is controllable via a regulating and control unit.

FIG. 2 shows the multi-component coupling carrier 6 of the double coupling which, via bearings 7, 8 is held in a coupling housing 9 in a way not described in detail. One of the seal 10 is shown symbolically. The coupling carrier connected to a crown wheel 11 attached to a flange part 14 by bolts 13.

In the coupling carrier, a first set of outer plates 15 and a second set of outer plates 16 are held non-rotatingly and axially movably, with a spacer 12 being arranged therebetween. The outer plates 15, 16 are each engaged by inner plates 17, 18 which are also axially movable and non-rotatingly engage axle shaft gears 19, 20. These are connected to axle shafts 21, 22 with connecting flanges for bolting on the sideshafts of the second driving axle.

Inside the coupling housing 9 there is provided an expanding disc assembly 25 which comprises a rotatable supporting disc 26, an axially movable, non-rotatable pressure disc 27 and intermediate rolling members 28 held in tracks 36 with circumferentially variable depths. The supporting disc 26 comprises circumferential teeth 29 via which it is rotatably drivable via a setting member. The disc 26 is supported at the housing 10, i.e. indirectly via a pressure plate 35, with the pressure disc 17, in turn, via an axial bearing 31, acting on a first pressure plate 32 and, via axial pins 33 passing through the coupling carrier, on a further pressure plate 34 inside the coupling carrier. Via these, the two sets of plates are subjected to the same amount of forces.

List of reference numbers 1 drive unit
2 differential drive
3 double coupling assembly
4 main driving axle
5 second driving axle
6 coupling carrier
7 bearing
8 bearing
9 coupling housing
10 seal
11 crown wheel
12 spacer
13 bolt
14 flange
15 outer plate (on the left)
16 outer plate (on the right)
17 inner plate (on the left)
18 inner plate (on the right)
19 axle shaft gear
20 axle shaft gear
21 axle shaft
22 axle shaft 23 flange
24 flange
25 adjusting assembly
26 supporting disc
27 pressure disc
28 rolling member
29 outer teeth
30 axial bearing
31 axial bearing
32 pressure plate
33 pin
34 pressure plate
35 pressure plate

We claim:

1. A drive assembly for a motor vehicle, having two drivable axles, a first axle being driven permanently by a drive unit and at least a second axle being connectable via only a double friction coupling assembly so as to be externally controllable, with the double friction coupling assembly comprising a common drivable coupling carrier with outer plates and individual sets of inner plates each connected to first and second axle shafts of the second driving axle and said outer and inner plates are friction plates, such that only when said friction plates are locked together are said shafts enabled to be driven by said carrier, characterised in that the double coupling is actuated by a common actuating device, thereby permitting both sets of friction plates of the double friction coupling to be loaded by the same amount of actuation forces with the first and second axle shafts being disengaged from said first axle and from each other when said double-coupling is in a non-actuated state; and said actuating device for the double coupling comprising a mechanical expanding mechanism which, in turn, comprises two expanding discs which are rotatable relative to each other and which are provided with rolling members which run in rolling member guide tracks rising in opposite directions and which, upon rotation of one of the expanding discs cause an axial forward movement of the expanding disc acting on the sets of plates.

2. A drive assembly according to claim 1 characterized in that the rotatable expanding disc 26 is stationarily supported in a coupling housing 9 and that the axially movable expanding disc 27 is guided non-rotatingly in said coupling housing 9.

* * * * *